US008243837B2

(12) United States Patent
Iwai et al.

(10) Patent No.: US 8,243,837 B2
(45) Date of Patent: Aug. 14, 2012

(54) SEQUENCE ALLOCATING METHOD AND WIRELESS MOBILE STATION DEVICE

(75) Inventors: Takashi Iwai, Ishikawa (JP); Daichi Imamura, Kanagawa (JP); Tomofumi Takata, Ishikawa (JP); Yoshihiko Ogawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 417 days.

(21) Appl. No.: 12/665,249

(22) PCT Filed: Jun. 18, 2008

(86) PCT No.: PCT/JP2008/001564
§ 371 (c)(1),
(2), (4) Date: Dec. 17, 2009

(87) PCT Pub. No.: WO2008/155907
PCT Pub. Date: Dec. 24, 2008

(65) Prior Publication Data
US 2010/0210274 A1    Aug. 19, 2010

(30) Foreign Application Priority Data
Jun. 19, 2007  (JP) ................................. 2007-161934

(51) Int. Cl.
*H04K 1/10*    (2006.01)
(52) U.S. Cl. ....................................... 375/260
(58) Field of Classification Search ............... 375/141, 375/146, 260
See application file for complete search history.

(56) References Cited

U.S. PATENT DOCUMENTS

2008/0267137 A1* 10/2008 Dabak et al. .................. 370/336
2010/0105405 A1*  4/2010 Vujcic ......................... 455/452.1
2010/0284350 A1* 11/2010 Korhonen et al. ............ 370/329

OTHER PUBLICATIONS

International Search Report dated Aug. 26, 2008.
3GPP TSG RAN WG1 Meeting #49bis, Huawei, Sequence Grouping Rule for UL DM RS, R1-072893, Jun. 2007, pp. 1-8.
3GPP TSG RAN WG1 Meeting #49bis, Panasonic, Further consideration on uplink RS hopping and grouping, R1-072804, Jun. 2007, pp. 1-8.
3GPP TSG RAN WGI Meeting #51bis, Panasonic, RS sequence grouping for E-UTRA uplink, R1-080145, Jan. 2008, pp. 1-5.
3GPP TSG RAN WG1 Meeting #51bis, Huawei, Interference Mitigation between Sequence-Group, R1-080115, Jan. 2008, pp. 1-4.
3GPP TSG RAN WG1 #51-bis, LG Electronics, Details on grouping for UL DM RS, R1-080257, Jan. 2008, pp. 1-6.
3GPP TSG RAN WG1 #48, LG Electronics, Binding method for UL RS sequence with different lengths, RI-070911, Feb. 2007, pp. 1-4.
3GPP TSG RAN WG1Meeting #47bis, Huawei, R1-070367, Sequence Allocation Method for E-UTRA Uplink Reference Signal, Sorrento, Italy, Jan. 15-19, 2007, pp. 1-3.

(Continued)

*Primary Examiner* — Don N Vo
(74) *Attorney, Agent, or Firm* — Dickinson Wright PLLC

(57) ABSTRACT

It is an object to provide a sequence allocating method that, while maintaining the number of Zadoff-Chu sequences to compose a sequence group, is configured to make it possible to reduce correlations between different sequential groups and between same sequential groups. This method comprises the steps of setting a standard sequence with a standard sequence length (Nb) and a standard sequence number (rb) in a step (ST101), setting a threshold values (Xth1($m$)) and (Xth2($m$)) in accordance with an RB number (m) in a step (ST103), setting a sequence length (N) corresponding to RB number (m) in a step (ST104), judging whether $|r/N-rb/Nb|=Xth1(m)$ is satisfied in a step (ST106), judging whether $|r/N-rb/Nb|=Xth2(m)$ is satisfied in a step (ST107), including Zadoff-Chu sequences with a sequence number (r) and a sequence length (N) in a sequence group (rb) in a step (ST108); if both judgments are positive, and allocating the sequence group (rb) to the same cell in a step (ST113).

11 Claims, 12 Drawing Sheets

OTHER PUBLICATIONS

3GPP TSG RAN WG1 Meeting #48bis, LG Electronics, R1-071542, Binding method for UL RS sequence with different lengths, St. Julians, Malta, Mar. 26-30, 2007, pp. 1-4.

3GPP TSG RAN WG1 Meeting #47, Panasonic, R1-063183, Narrow band uplink reference signal sequences and allocation for E-UTRA, Riga, Latcia, Nov. 6-10, 2006, pp. 1-4.

* cited by examiner

| RB# | N | r |
|---|---|---|
| 1 | 13 | 1 |
| 2 | 29 | 2 3 |
| 3 | 37 | 2 3 4 |
| 4 | 53 | 3 4 5 6 |
| 5 | 61 | 3 4 5 6 7 |
| 6 | 73 | 3 4 5 6 7 8 |
| 8 | 97 | 4 5 6 7 8 9 10 11 |
| 9 | 109 | 5 6 7 8 9 10 11 12 |
| 10 | 127 | 5 6 7 8 9 10 11 12 13 14 |
| 12 | 149 | 6 7 8 9 10 11 12 13 14 15 16 17 |
| 15 | 181 | 7 8 9 10 11 12 13 14 15 16 17 18 19 20 |
| 16 | 193 | 8 9 10 11 12 13 14 15 16 17 18 19 20 21 22 |
| 18 | 223 | 9 10 11 12 13 14 15 16 17 18 19 20 21 22 23 24 25 |
| 20 | 241 | 10 11 12 13 14 15 16 17 18 19 20 21 22 23 24 25 26 27 |
| 24 | 293 | 12 13 14 15 16 17 18 19 20 21 22 23 24 25 26 27 28 29 30 31 32 33 |

FIG.5A

PRIOR ART

| RB# | N | r |
|---|---|---|
| 1 | 13 | 2 |
| 2 | 29 | 4 5 |
| 3 | 37 | 5 6 7 |
| 4 | 53 | 7 8 9 10 |
| 5 | 61 | 8 9 10 11 |
| 6 | 73 | 9 10 11 12 13 14 |
| 8 | 97 | 12 13 14 15 16 17 18 |
| 9 | 109 | 13 14 15 16 17 18 19 20 |
| 10 | 127 | 15 16 17 18 19 20 21 22 23 24 |
| 12 | 149 | 18 19 20 21 22 23 24 25 26 27 28 |
| 15 | 181 | 21 22 23 24 25 26 27 28 29 30 31 32 33 34 |
| 16 | 193 | 23 24 25 26 27 28 29 30 31 32 33 34 35 36 37 |
| 18 | 223 | 26 27 28 29 30 31 32 33 34 35 36 37 38 39 40 41 42 |
| 20 | 241 | 28 29 30 31 32 33 34 35 36 37 38 39 40 41 42 43 44 45 46 |
| 24 | 293 | 34 35 36 37 38 39 40 41 42 43 44 45 46 47 48 49 50 51 52 53 54 55 56 |

FIG.5B

PRIOR ART

| RB# | N | r |
|---|---|---|
| 1 | 13 | 1 |
| 2 | 29 | 3 |
| 3 | 37 | 2 4 |
| 4 | 53 | 3 4 6 |
| 5 | 61 | 3 4 5 6 7 |
| 6 | 73 | 3 7 8 |
| 8 | 97 | 4 5 10 11 |
| 9 | 109 | 5 6 11 12 |
| 10 | 127 | 5 6 7 13 14 |
| 12 | 149 | 6 7 8 15 16 17 |
| 15 | 181 | 7 8 9 18 19 20 |
| 16 | 193 | 8 9 10 20 21 22 |
| 18 | 223 | 9 10 11 23 24 25 |
| 20 | 241 | 10 11 12 25 26 27 |
| 24 | 293 | 12 13 32 33 |

FIG.9

SEQUENCE ALLOCATING METHOD AND WIRELESS MOBILE STATION DEVICE

TECHNICAL FIELD

The present invention relates to a sequence allocating method and radio mobile station apparatus that are used in a cellular radio communication system.

BACKGROUND ART

In 3GPP LTE (3rd Generation Partnership Project Long Term Evolution), a Zadoff-Chu sequence ("ZC sequence") is adopted as a reference signal ("RS") that is used in uplink. The reason for adopting a ZC sequence as an RS is that a ZC sequence has a uniform frequency characteristic and has good autocorrelation and cross-correlation characteristics. A ZC sequence is a kind of CAZAC (Constant Amplitude and Zero Auto-correlation Code) sequence and represented by following equation 1 or equation 2.

(Equation 1)

$$a_r(k) = \begin{cases} e^{-j\frac{2\pi r}{N}(k^2/2+qk)}, & N: \text{even} \\ e^{-j\frac{2\pi r}{N}(k(k+1)/2+qk)}, & N: \text{odd} \end{cases} \quad [1]$$

(Equation 2)

$$a_r(k) = \begin{cases} e^{j\frac{2\pi r}{N}(k^2/2+qk)}, & N: \text{even} \\ e^{j\frac{2\pi r}{N}(k(k+1)/2+qk)}, & N: \text{odd} \end{cases} \quad [2]$$

In equation 1 and equation 2, "N" is the sequence length, "r" is the ZC sequence number, and "N" and "r" are coprime. Also, "q" is an arbitrary integer. It is possible to generate N−1 quasi-orthogonal sequences of good cross-correlation characteristics from a ZC sequence having a sequence length N of a prime number. In this case, the cross-correlation is constant at √N between the N−1 quasi-orthogonal sequences generated.

Here, in the RS's that are used in uplink, the reference signal for channel estimation used to demodulate data (i.e. DM-RS (Demodulation Reference Signal)) is transmitted in the same band as the data transmission bandwidth. That is, when the data transmission bandwidth is narrow, a DM-RS is also transmitted in a narrow band. For example, if the data transmission bandwidth is one RB (Resource Block), the DM-RS transmission bandwidth is also one RB. Likewise, if the data transmission bandwidth is two RB's, the DM-RS transmission bandwidth is also two RB's. Also, in 3GPP LTE, one RB is comprised of twelve subcarriers. Consequently, a ZC sequence having a sequence length N of 11 or 13 is used as a DM-RS that is transmitted in one RB, and a ZC sequence having a sequence length N of 23 or 29 is used as a DM-RS that is transmitted in two RB's. Here, when a ZC sequence having a sequence length N of 11 or 23 is used, a DM-RS of 12 subcarriers or 24 subcarriers is generated by cyclically expanding the sequence, that is, by copying the front data of the sequence to the rear of the sequence. On the other hand, when a ZC sequence having a sequence length N of 13 or 29 is used, a DM-RS of 12 subcarriers or 24 subcarriers is generated by performing truncation, that is, by deleting part of the sequence.

As a method of allocating ZC sequences, to reduce the interference between DM-RS's that are used between different cells, that is, to reduce the inter-cell interference of DM-RS, in each RB, ZC sequences of different sequence numbers are allocated to adjacent cells as DM-RS's. The data transmission bandwidth is determined by scheduling in each cell, and therefore DM-RS's of different transmission bandwidths are multiplexed between cells. However, if ZC sequences of different transmission bandwidths, that is, ZC sequences of different sequence lengths, are multiplexed, a specific combination of ZC sequence numbers has a high cross-correlation.

FIG. 1 illustrates cross-correlation characteristics between ZC sequences in combinations of different sequence numbers, which are acquired by the present inventors from computer simulation. To be more specific, FIG. 1 illustrates the cross-correlation characteristics between a ZC sequence of a sequence length N=11 and sequence number r=3, and ZC sequences of a sequence length N=23 and sequence numbers r=1 to 6. In FIG. 1, the horizontal axis represents the delay time using the number of symbols, and the vertical axis represents the normalized cross-correlation values, that is, the values dividing the cross-correlation values by N. As shown in FIG. 1, the maximum cross-correlation value is very high with the combination of a ZC sequence of r=3 and N=11 and a ZC sequence of r=6 and N=23, and is about three times higher than the cross-correlation value in a single transmission bandwidth, 1/√N, that is, 1/√11.

FIG. 2 illustrates the inter-cell interference of DM-RS in a case where specific combinations of ZC sequences that increase cross-correlation are allocated to adjacent cells. To be more specific, a ZC sequence of r=a and N=11 and a ZC sequence of r=b and N=23 are allocated to cell #A, and a ZC sequence of r=c and N=23 and a ZC sequence of r=d and N=11 are allocated to cell #B. In this case, the combination of the ZC sequence of r=a and N=11 allocated to cell #A and the ZC sequence of r=c and N=23 allocated to cell #B, or the combination of the ZC sequence of r=b and N=23 allocated to cell #A and the ZC sequence of r=d and N=11 allocated to cell #B, increases the inter-cell interference of DM-RS, and, consequently, degrades the accuracy of channel estimation and degrades the data demodulation performance significantly.

To avoid such problems, the ZC sequence allocating method disclosed in Non-Patent Document 1 is used in a cellular radio communication system. To reduce inter-cell interference, Non-Patent Document 1 suggests allocating a combination of ZC sequences of high cross-correlation and different sequence lengths, to the single cell.

FIG. 3 illustrates the ZC sequence allocating methods disclosed in Non-Patent Document 1 and Non-Patent Document 2. In FIG. 3, the example shown in FIG. 2 is used. As shown in FIG. 3, a combination of ZC sequences of high cross-correlation, that is, a combination of a ZC sequence of r=a and N=11 and a ZC sequence of r=c and N=23, is allocated to a single cell (cell #A in this case). Also, another combination of ZC sequences of high cross-correlation, that is, a combination of a ZC sequence of r=d and N=11 and a ZC sequence of r=b and N=23, is allocated to a single cell (cell #B in this case). In the single cell, transmission bands are scheduled by one radio base station apparatus, and, consequently, ZC sequences of high correlation allocated to the same cell, are not multiplexed. Therefore, inter-cell interference is reduced.

Also, Non-Patent Document 2 proposes a method of finding a combination of ZC sequence numbers used in each RB (hereinafter referred to as a "sequence group"). ZC sequences have a feature of having higher cross-correlation when the difference of r/N, that is, the difference of sequence number/sequence length is smaller. Therefore, based on a sequence of an arbitrary RB (e.g. one RB), ZC sequences that make the difference between r/N and rb/Nb equal to or less than a predetermined threshold, are found from the ZC sequences of each RB, and the resulting multiple ZC sequences are allocated to a cell as one sequence group.

FIG. 4 illustrates a sequence group generation method disclosed in Non-Patent Document 2. In FIG. 4, the horizontal axis represents r/N, and the vertical axis represents the ZC sequence of each RB. First, the reference sequence length Nb and reference sequence number rb are set. Hereinafter, a ZC sequence having a reference sequence length Nb and reference sequence number rb is referred to as a "reference sequence."

For example, if Nb is 13 (which is the sequence length associated with one RB) and rb is 1 (which is selected from 1 to Nb−1), rb/Nb is 1/13. Next, ZC sequences that make the difference between r/N and rb/Nb from the reference rb/Nb equal to or less than a predetermined threshold, are found from the ZC sequences of each RB, to generate a sequence group. Also, the reference sequence number is changed, and, in the same process as above, other sequence groups are generated. Thus, it is possible to generate different sequence groups for the number of reference sequence numbers, that is, it is possible to generate Nb−1 different sequence groups. Here, if the ranges for selecting ZC sequences, in which the difference from rb/Nb is equal to or less than a predetermined threshold, overlap between adjacent sequence groups, the same ZC sequences are included in the plurality of sequence groups, and therefore the sequence numbers overlap between cells. Therefore, to prevent ranges for selecting ZC sequences from overlapping in adjacent sequence groups, the above predetermined threshold is set to, for example, a value less than 1/(2Nb).

FIG. 5A and FIG. 5B illustrate examples of sequence groups generated by the sequence group generation method disclosed in Non-Patent Document 2. Here, the sequence length N is set to the prime number that is larger than the maximum possible size of transmission in the transmission bandwidth and that is the closest to this size, and, furthermore, the sequence length N is uniquely determined from the number of RB's. FIG. 5A and FIG. 5B illustrate sequence groups (ZC sequence group 1 and ZC sequence group 2) comprised of ZC sequences that satisfy following equation 3 in a case where the reference sequence length Nb is 13 and the reference sequence number rb is 1 or 2. In equation 3, to prevent the same sequence from being included in a plurality of sequence groups, the threshold Xth is, for example, 1/(2Nb) (i.e. 1/26).

$$|rb/Nb - r/N| \leq Xth \quad \text{(Equation 3)}$$

Thus, according to the sequence allocating methods disclosed in Non-Patent Document 2, a sequence group comprised of ZC sequences in which the difference between r/N and rb/Nb is equal to or less than a predetermined threshold, that is, a sequence group comprised of ZC sequences having cross-correlation equal to or greater than a predetermined threshold, is generated, and the generated sequence group is allocated to a single cell. By this means, it is possible to allocate a combination of ZC sequences of large cross-correlation and different sequence lengths to a single cell, and reduce inter-cell interference.

However, with the sequence groups of Non-Patent Document 1 and Non-Patent Document 2, cross-correlation in a single sequence group increases, and, consequently, if a single sequence group is allocated to adjacent cells, large inter-cell interference is caused.

Non-Patent Document 3 proposes, in order to reduce inter-cell interference utilizing the same ZC sequences, using different cyclic shift sequences of the same sequence number r between cells in which the radio base station apparatuses establish time synchronization (e.g. between cells belonging to the same radio base station apparatus). Here, cyclic shift sequences refer to ZC sequences have the same sequence number r and different cyclic shift values, and are generated by cyclically shifting a ZC sequence of the sequence number r by predetermined cyclic shift values on the time domain. By setting a cyclic shift value over the maximum delay time of delay waves, if the transmission bandwidths and transmission band positions are the same between DM-RS's, the receiving side can determine the detection range for the correlation value peak based on the cyclic shift value, so that it is possible to receive DM-RS's from different mobile devices at the same time.

Non-Patent Document 1: Huawei, R1-070367, "Sequence Allocation Method for E-UTRA Uplink Reference Signal", 3GPP TSG RAN WG1 Meeting #47bis, Sorrento, Italy 15-19 Jan., 2007

Non-Patent Document 2: LG Electronics, R1-071542, "Binding method for UL RS sequence with different lengths, 3GPP TSG RAN WG1 Meeting #48bis, St. Julians, Malta, Mar. 26-30, 2007

Non-Patent Document 3: Panasonic, R1-063183, "Narrow band uplink reference signal sequences and allocation for E-UTRA", 3GPP TSG RAN WG1 Meeting #47, Riga, Latcia, Nov. 6-10, 2006

DISCLOSURE OF INVENTION

Problems to be Solved by the Invention

However, the transmission bandwidth and transmission band position of DM-RS are determined by the scheduler of each cell. Therefore, there is a case where DM-RS's of different transmission bandwidths and transmission band positions are transmitted from cells. If DM-RS's of different transmission bandwidths and transmission band positions are multiplexed, the correlation value peak calculated on the receiving side may occur in a different position from the detection range set in advance in each cell. If the detection range for the correlation value peak of the subject cell includes the correlation value peak of DM-RS from another cell, this correlation value peak cannot be separated on the receiving side, and, consequently, this correlation value peak becomes an interference component. Due to an occurrence of this interference, the accuracy of channel estimation degrades and the data demodulation performance degrades significantly.

Especially, cross-correlation increases in a single sequence group generated by the sequence group generating method disclosed in Non-Patent Document 2, and, consequently, if a single sequence group is allocated to adjacent cells, inter-cell interference increases. That is, if ZC sequences of a small difference between r/N and rb/Nb are allocated to RB's in adjacent cells, inter-cell interference increases.

FIG. 6 illustrates a problem that arises when ZC sequences with a small difference between r/N and rb/Nb are allocated to RB's in adjacent cells. As shown in FIG. 6, ZC sequences allocated to different RB's (i.e. different sequence lengths) have a small difference between r/N and rb/Nb and have large cross-correlation, and, consequently, inter-cell interference increases.

It is therefore an object of the present invention to provide a sequence allocating method and radio mobile station apparatus that can reduce cross-correlation between different sequence groups and reduce cross-correlation in a single sequence group.

Means for Solving the Problem

The sequence allocating method of the present invention for Zadoff-Chu sequences represented by equation 1 in a cellular radio communication system, includes: a reference setting step of setting a reference sequence length Nb and a reference sequence number rb; a threshold setting step of setting a first threshold based on a sequence length N and a second threshold that is less than the first threshold; a selecting step of selecting a plurality of Zadoff-Chu sequences, in which a difference between r/N and rb/Nb is equal to or less than the first threshold or less than the first threshold and equal to or greater than the second threshold, from the Zadoff-Chu sequences generated according to equation 1; and an allocating step of allocating the plurality of Zadoff-Chu sequences selected to a single cell.

The radio mobile station apparatus of the present invention that transmits Zadoff-Chu sequences represented by equation 1 as a reference signal, employs a configuration having: a setting section that sets a first threshold and a second threshold that is less than the first threshold, based on a sequence length N signaled from a radio base station apparatus; a selecting section that selects a Zadoff-Chu sequence, in which a difference between r/N and rb/Nb (where Nb is a reference sequence length) is equal to or less than the first threshold or less than the first threshold and equal to or greater than the second threshold, from the Zadoff-Chu sequences generated according to equation 1, using a reference sequence number rb signaled from the radio base station apparatus; and a transmitting section that transmits the selected Zadoff-Chu sequence as the reference signal.

The transmitting method of the present invention whereby a radio mobile station apparatus transmits Zadoff-Chu sequences represented by equation 1 as a reference signal, in which the radio mobile station apparatus: sets a first threshold and a second threshold that is less than the first threshold, based on a sequence length N signaled from a radio base station apparatus; selects a Zadoff-Chu sequence, in which a difference between r/N and rb/Nb (where Nb is a reference sequence length) is equal to or less than the first threshold or less than the first threshold and equal to or greater than the second threshold, from the Zadoff-Chu sequences generated according to equation 1, using a reference sequence number rb signaled from the radio base station apparatus; and transmits the selected Zadoff-Chu sequence as the reference signal.

Advantageous Effect of the Invention

According to the present invention, it is possible to reduce cross-correlation between different sequence groups allocated to cells in a cellular radio communication system and reduce cross-correlation in a single sequence group.

BRIEF DESCRIPTION OF DRAWINGS

FIG. 5A illustrates an example of a sequence group generated by a sequence group generation method according to the prior art (ZC sequence group 1);
FIG. 5B illustrates an example of a sequence group generated by a sequence group generation method according to the prior art (ZC sequence group 2);
FIG. 9 illustrates an example of a sequence group acquired by a sequence allocating method according to an embodiment of the present invention.

BEST MODE FOR CARRYING OUT INVENTION

An embodiment of the present invention will be explained below in detail with reference to the accompanying drawings.

Embodiment 1

Figure 1:
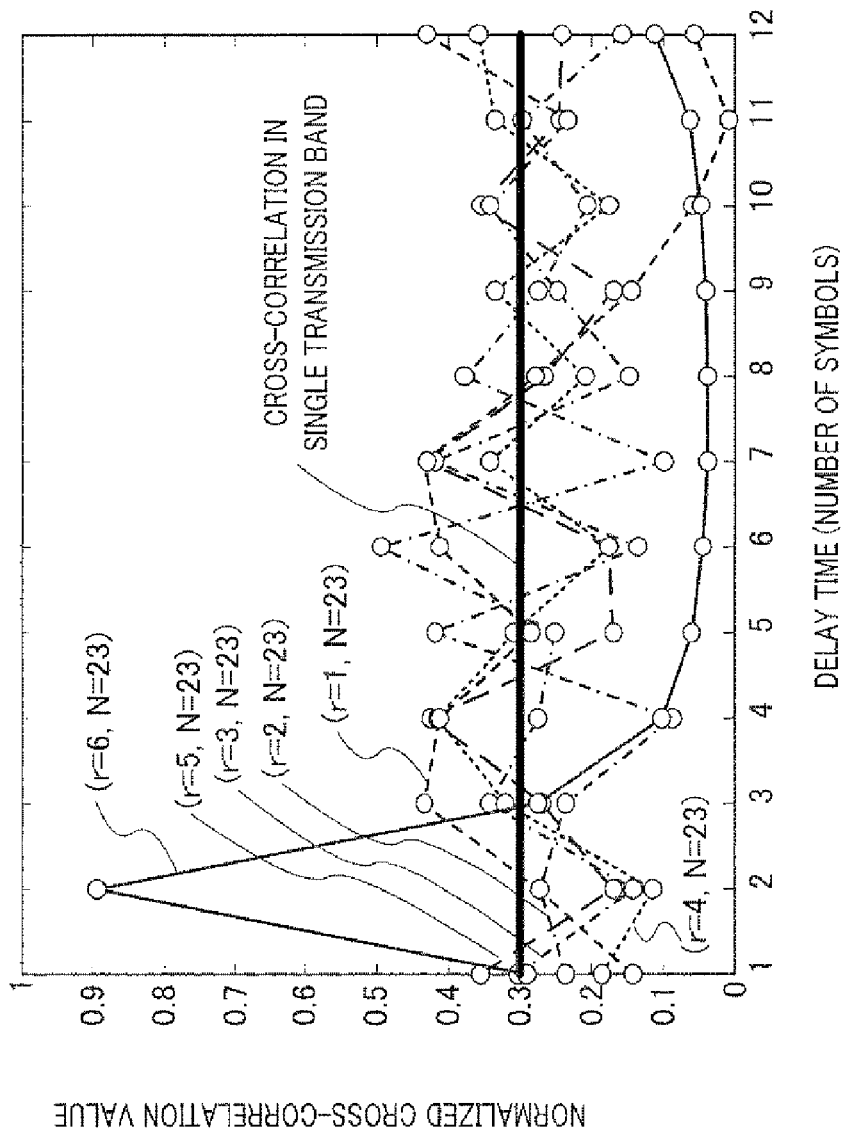
FIG. 1 illustrates cross-correlation characteristics between ZC sequences in combinations of different sequence numbers, which are acquired by computer simulation, according to the prior art.
Figure 2:
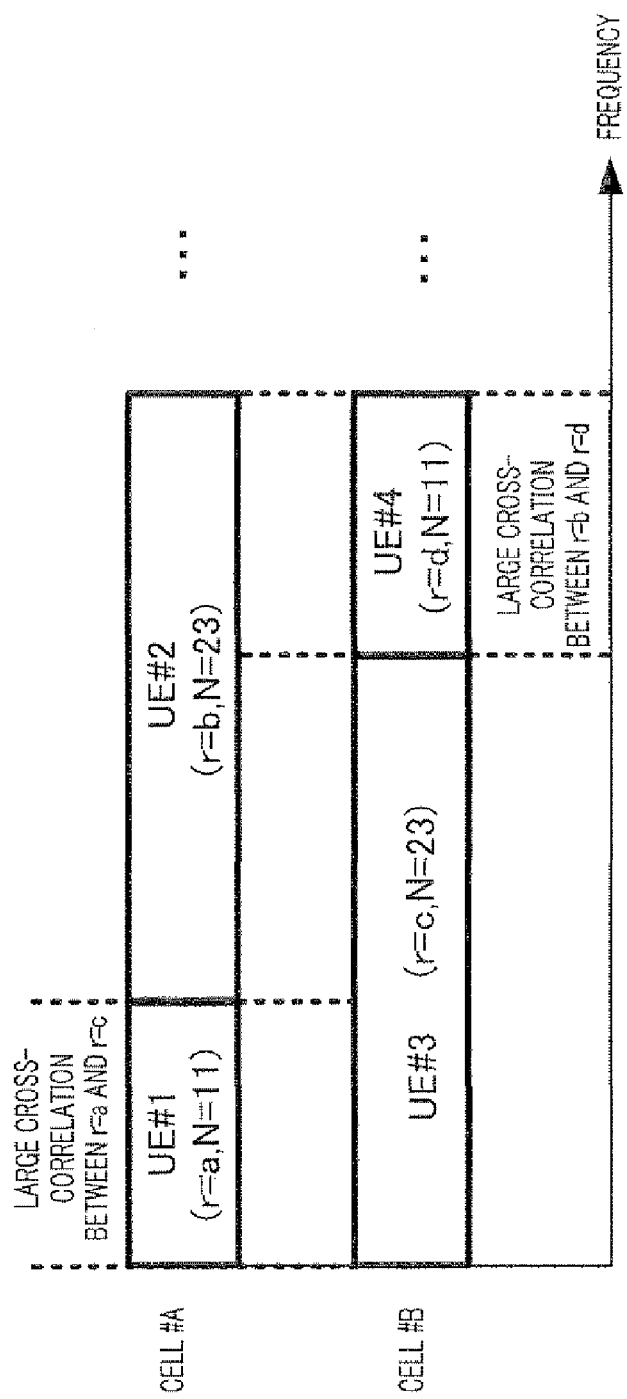
FIG. 2 illustrates inter-cell interference between DM-RS's in a case where specific combinations of ZC sequences that increase cross-correlation are allocated to adjacent cells, according to the prior art.
Figure 3:
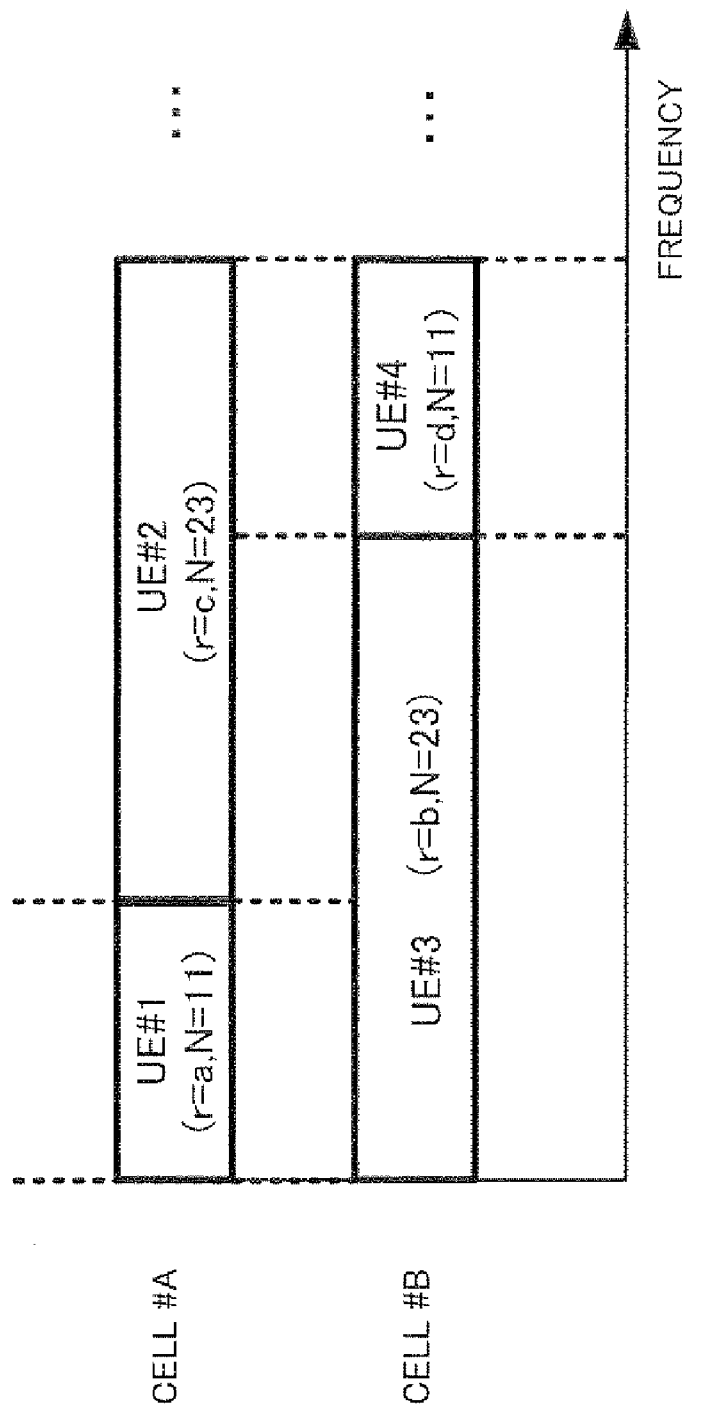
FIG. 3 illustrates a method of allocating ZC sequences according to the prior art.
Figure 4:
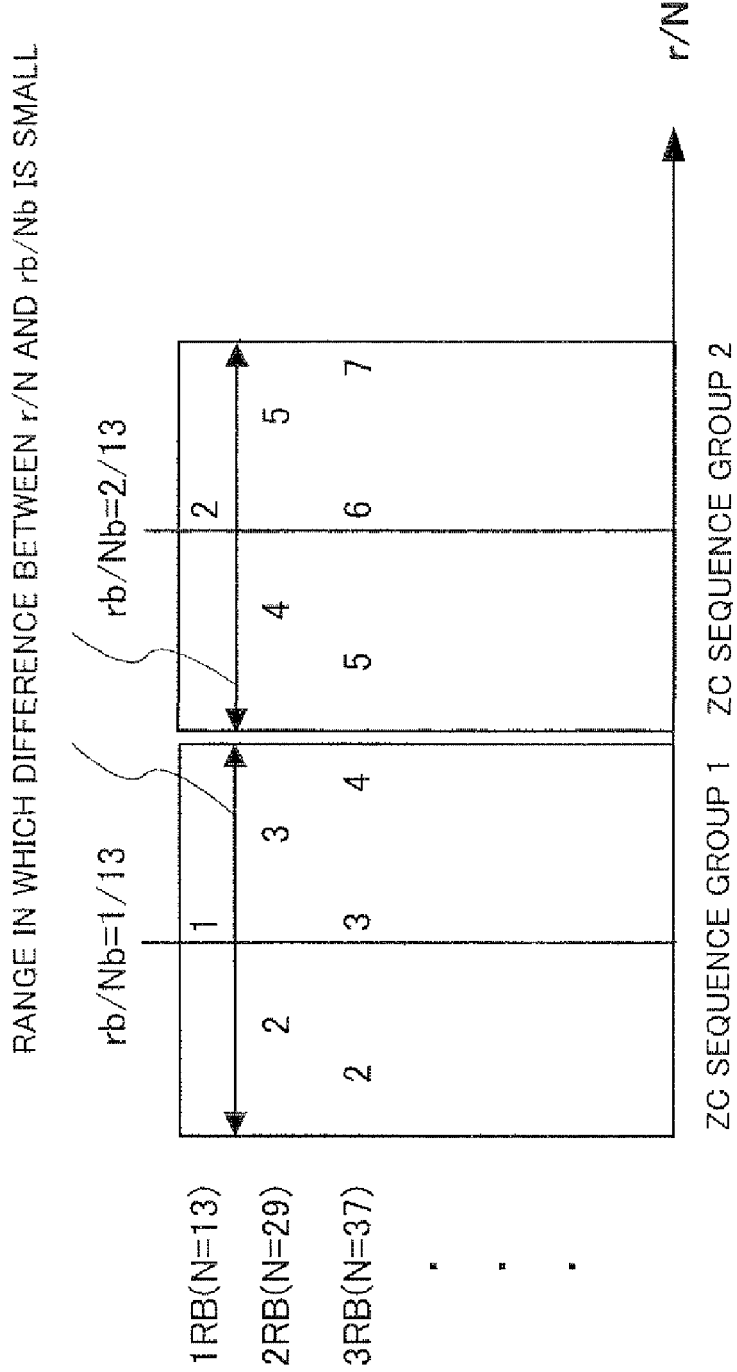
FIG. 4 illustrates a method of generating sequence groups according to the prior art.
Figure 6:
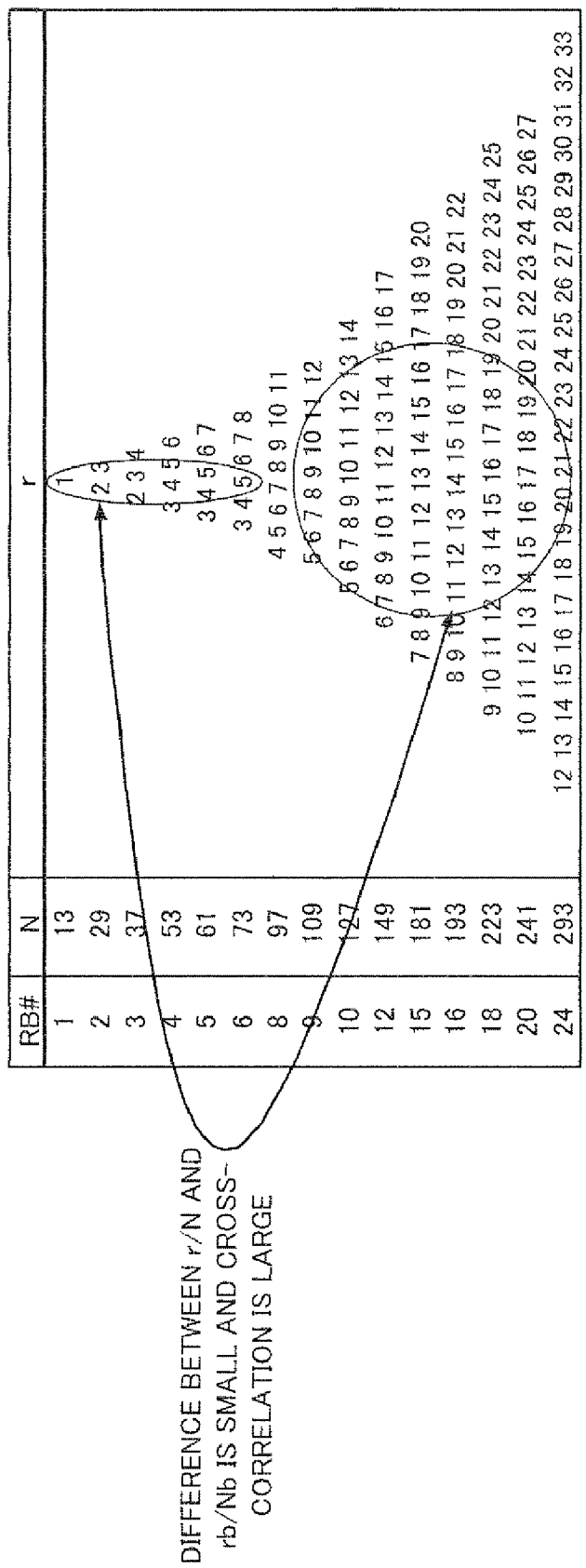
FIG. 6 illustrates a problem with the prior art that arises when ZC sequences with a small difference between r/N and rb/Nb are allocated to RB's in adjacent cells.
Figure 7:
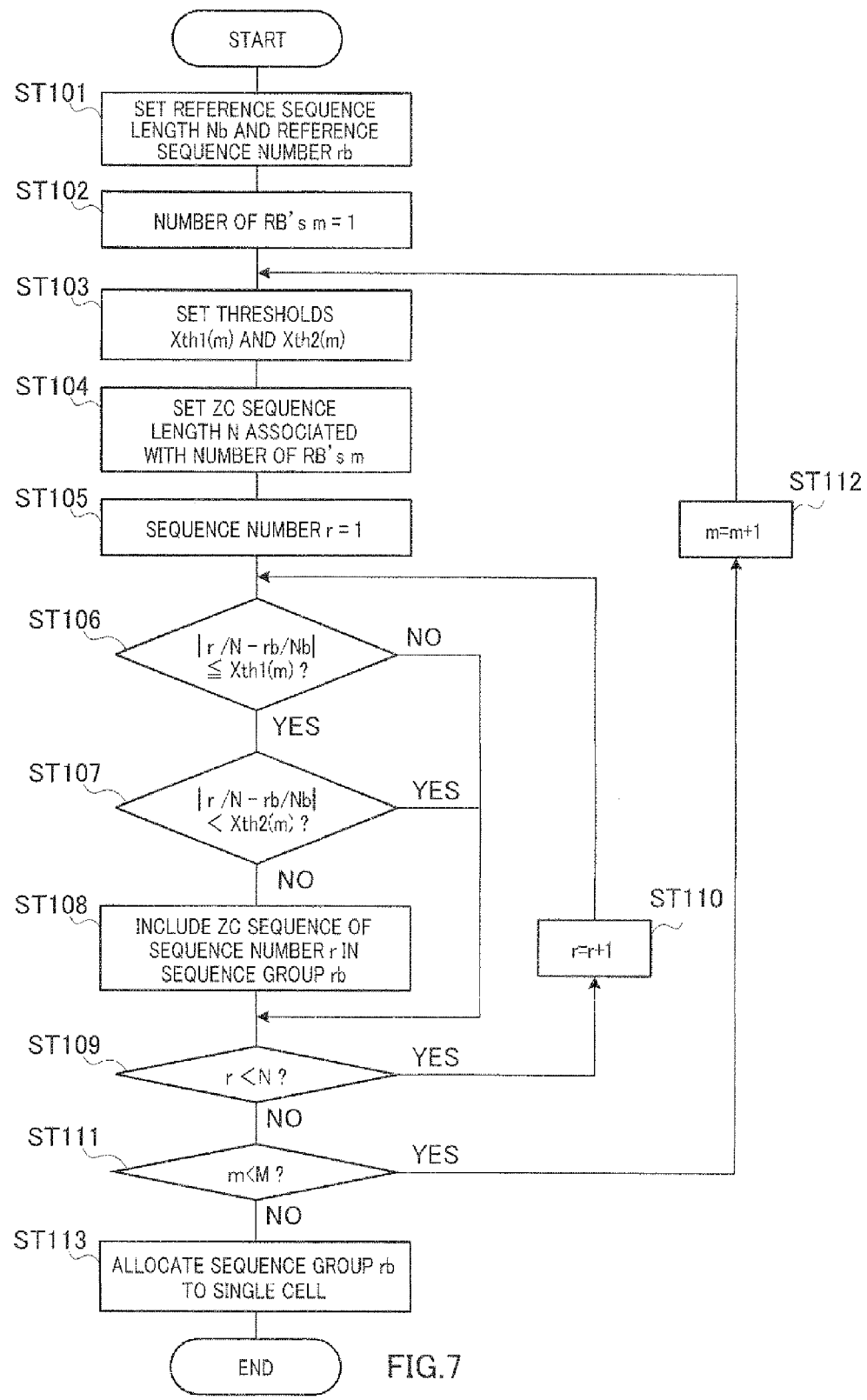
FIG. 7 is a flowchart showing the process of a sequence allocating method in a cellular radio communication system according to an embodiment of the present invention.

FIG. 7 is a flowchart showing the process of a sequence allocating method in a cellular radio communication system according to Embodiment 1 of the present invention.

First, in step (hereinafter "ST") 101, the reference sequence length Nb and the reference sequence number rb are set for a generated sequence group. Here, the sequence number rb corresponds to the sequence group number and is lower than Nb.

In ST 102, the number of RB's, m, is initialized to 1.

In ST 103, the threshold $Xth1(m)$ and threshold $Xth2(m)$ that are associated with the number of RB's m is set. Here, the method of setting the threshold $Xth1(m)$ and $Xth2(m)$ will be described later.

In ST 104, the ZC sequence length N associated with the number of RB's m is set. The number of RB's m and the sequence length N are uniquely associated. For example, N is the prime number that is larger than the maximum possible size of transmission with the number of RB's, m, and that is the closest to this size.

In ST 105, the sequence number r is initialized to 1.

In ST 106, whether or not r and N satisfy following equation 4 is decided.

$$|r/N - rb/Nb| \leq Xth1(m) \quad \text{(Equation 4)}$$

Following equation 5 is acquired from equation 4. That is, equation 4 and equation 5 are equivalent.

$$(rb/Nb - Xth1(m)) \times N \leq r \leq (rb/Nb + Xth1(m)) \times N \quad \text{(Equation 5)}$$

In ST 106, if r and N are decided to satisfy equation 4 ("YES" in ST 106), the process of ST 107 is performed.

In ST 107, whether or not r and N satisfy following equation 6 is decided.

$$|r/N - rb/Nb| < Xth2(m) \quad \text{(Equation 6)}$$

In ST 107, if r and N are decided to satisfy equation 6 ("YES" in ST 107), the process of ST 109 is performed.

In ST 107, when r and N are decided not to satisfy equation 6 ("NO" in ST 107), the process of ST 108 is performed.

In ST 108, a sequence number that satisfies equation 4 and that does not satisfy equation 6, is included in the sequence group rb as one ZC sequence associated with the number of RB's m.

In ST 106, when r and N are decided not to satisfy equation 4 ("NO" in ST 106), the process of ST 109 is performed.

In ST 109, whether or not r<N is decided.

In ST 109, if r<N is decided ("YES" in ST 109), the process of ST 110 is performed.

In ST 110, the sequence number r is incremented by one like r=r+1, and the step moves to ST 106.

In ST 109, if r<N is not decided ("NO" in ST 109), the process of ST 111 is performed.

In ST 111, whether or not m<M is decided. Here, M is the maximum value of the number of RB's m in the sequence group rb and corresponds to the maximum value of the transmission bandwidth.

In ST 111, if m<M is decided ("YES" in ST 111), the process of ST 112 is performed.

In ST 112, the number of RB's m is incremented by one like m=m+1, and the step moves to ST 103.

In ST 111, if m<M is not decided ("NO" in ST 111), the process of ST 113 is performed.

In ST 113, the generated sequence group rb is allocated to a single cell, that is, a single radio base station apparatus.

Next, the method of setting the thresholds Xth1(*m*) and Xth1(*m*) will be explained.

In the steps shown in FIG. 7, Xth2(*m*) is set smaller than Xth1(*m*). The process by the steps shown in FIG. 7 is equivalent to the process of deleting ZC sequences that satisfy equation 6 from a sequence group formed with ZC sequences that satisfy equation 4. Further, the process by the steps shown in FIG. 7 is equivalent to the process of finding ZC sequences, in which the difference between r/N and rb/Nb is equal to or less than Xth1(*m*) and equal to or greater than Xth2(*m*), and forming a sequence group.

Figure 8:
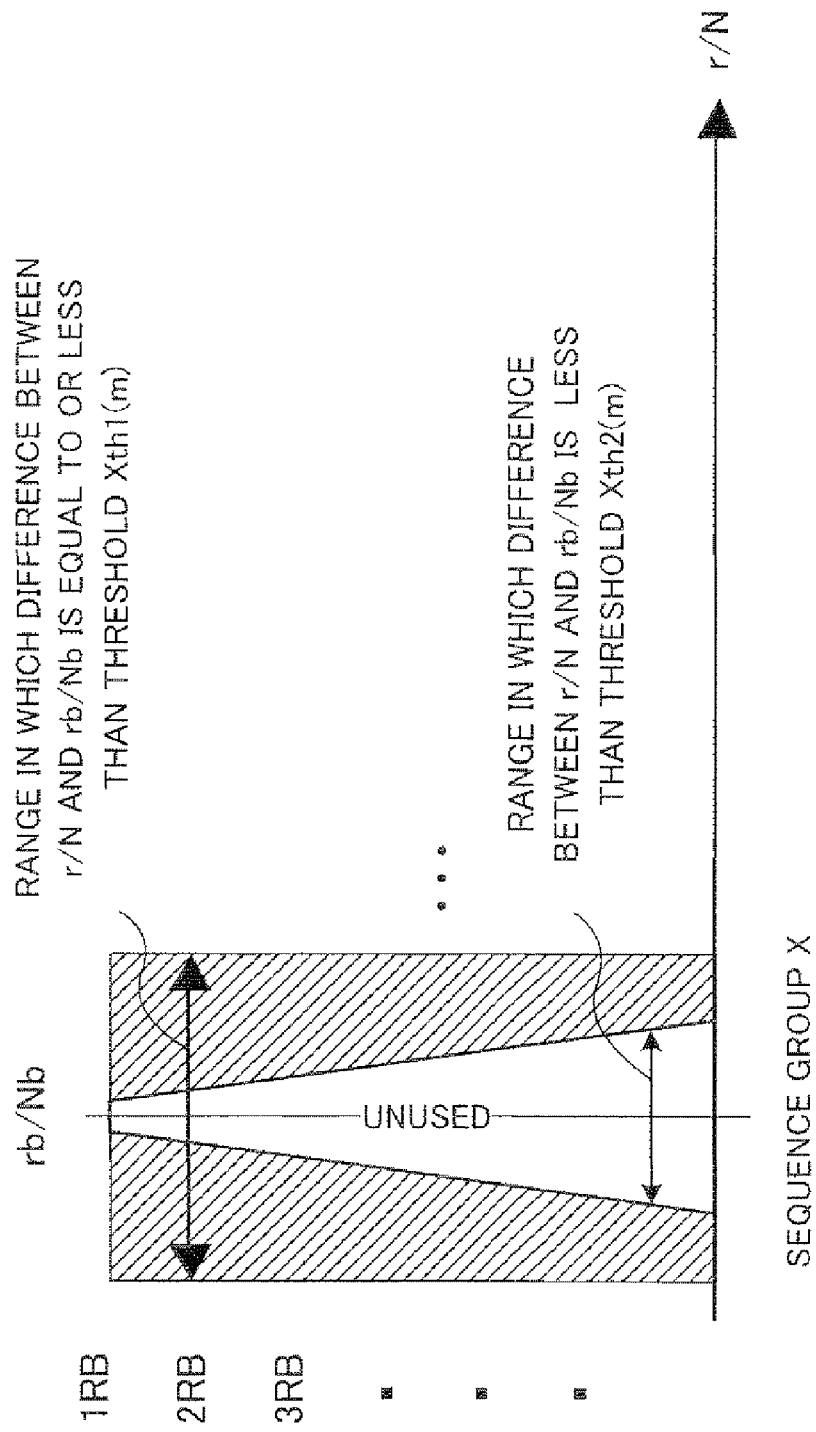
FIG. 8 illustrates a method of setting thresholds in a sequence allocating method according to an embodiment of the present invention.

FIG. 8 illustrates the method of setting the thresholds Xth1(*m*) and Xth2(*m*) in the sequence allocating method according to the present embodiment. In FIG. 8, the region represented by hatching and the blank represented by "unused" form group X. If Xth1(*m*) is set according to following equation 7, group X is the sequence group formed with ZC sequences that satisfy equation 4. If Xth2(*m*) is set according to following equation 8, the blank represented by "unused" shows the range of ZC sequences that satisfy equation 6, that is, the range of ZC sequences deleted from ZC sequence group X.

$$Xth1(m) = 1/(2Nb) \quad \text{(Equation 7)}$$

$$Xth2(m) = 1/(8Nb) + (m-1) \times 0.0009 \quad \text{(Equation 8)}$$

As shown in FIG. 8, when the number of RB's is smaller, Xth2(*m*) is set smaller. By this means, the number of ZC sequences to be deleted is limited when the number of RB's is smaller, so that ZC sequences are remained and ensured. By ensuring a predetermined number of sequences, when sequence hopping is applied for changing sequence numbers at predetermined time intervals, it is possible to provide an effect of randomizing interference. If the number of remaining sequences is small after the ZC sequences in the range represented by the blank are deleted from sequence group X in FIG. 8, the effect of randomizing interference cannot be provided. Especially, if the number of RB's is smaller (i.e. if the sequence length is shorter), the number of sequences originally existed is small, and, consequently, it is necessary to make the range for deleting sequences small and ensure the remaining sequences.

FIG. 9 illustrates an example of a sequence group generated by the sequence allocating method according to the present embodiment. To be more specific, the sequence group shown in FIG. 9 is acquired according to the following conditions and process. That is, in ST 101, the reference sequence length Nb is set 13, and the reference sequence number rb is set 1. Further, in ST 103, Xth1(*m*) is set 1/26 regardless of the number of RB's, and Xth2(*m*) is set according to equation 8.

Next, the operations of a radio base station apparatus that is present in a cell, to which sequence groups generated based on the sequence allocating method according to the present embodiment are allocated, will be explained.

Figure 10:
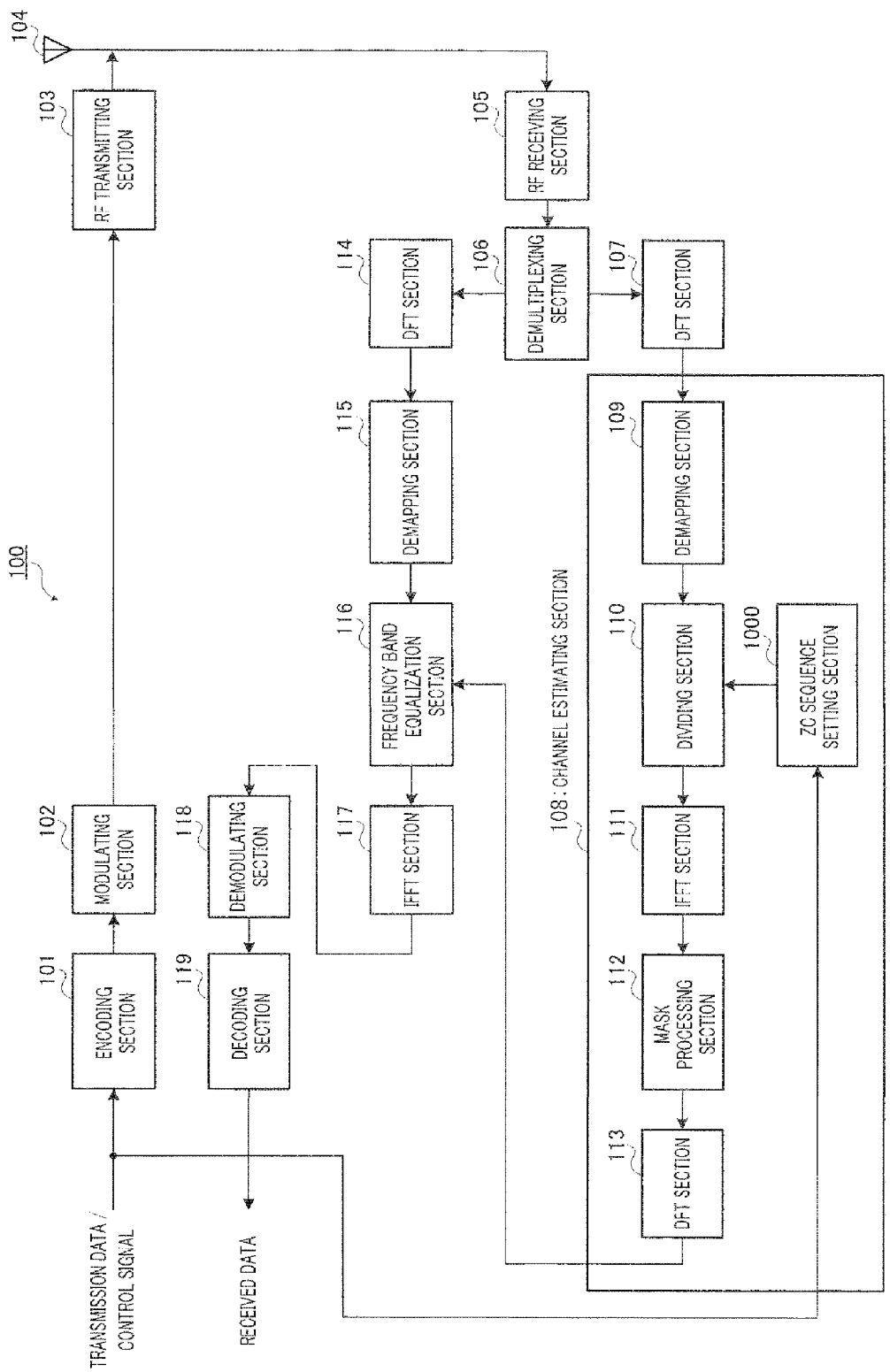
FIG. 10 is a block diagram showing the configuration of a radio base station apparatus to which a sequence group is allocated, according to an embodiment of the present invention.

FIG. 10 is a block diagram showing the configuration of radio base station apparatus 100, to which sequence groups are allocated, according to the present embodiment.

Encoding section 101 encodes transmission data and control signal for radio mobile station apparatus 200 (which will be described later in FIG. 12) that is present in the same cell as that of radio base station apparatus 100, and outputs the encoded data to modulating section 102. Here, the control signal includes the reference sequence length Nb and the reference sequence number rb associated with the sequence group number, and the reference sequence length Nb and the reference sequence number rb are transmitted to, for example, radio mobile station apparatus 200 via a broadcast channel. The control signal also includes scheduling information showing the transmission bandwidth including, for example, the number of RB's for transmission allocated to radio mobile station apparatus 200 and the sequence length N, and this scheduling information is transmitted to radio mobile station apparatus 200 via a control channel.

Modulating section 102 modulates the encoded data received as input from encoding section 101 and outputs the modulated signal to RF (Radio Frequency) transmitting section 103.

RF transmitting section 103 performs transmission processing such as A/D conversion, up-conversion and amplification on the modulated signal received as input from modulating section 102, and transmits the signal subjected to transmission processing via antenna 104.

RF receiving section 105 performs reception processing such as down-conversion and A/D conversion on a signal received via antenna 104, and outputs the signal subjected to reception processing to demultiplexing section 106.

Demultiplexing section 106 demultiplexes the signal received as input from RF receiving section 105 into a reference signal, data signal and control signal, outputs the reference signal to DFT (Discrete Fourier Transform) section 107 and outputs the data signal and control signal to DFT section 114.

DFT section 107 transforms the time domain reference signal received as input from demultiplexing section 106 into a frequency domain signal by performing DFT processing, and outputs the transformed, frequency domain reference signal to demapping section 109 in channel estimating section 108.

Channel estimating section 108 is provided with demapping section 109, dividing section 110, IFFT section 111, mask processing section 112 and DFT section 113, and estimates the channel based on the reference signal received as input from DFT section 107.

Demapping section 109 extracts, from the frequency domain reference signal received as input from DFT section 107, a ZC sequence corresponding to the transmission band of each radio mobile station apparatus 200, and outputs the extracted ZC sequences to dividing section 110.

ZC sequence setting section 1000 calculates the ZC sequences used in radio mobile station apparatuses 200, based on the reference sequence length Nb, the reference sequence number rb and the number of RB's assigned to each radio mobile station apparatus 200, which are included in control information received as input, and outputs the results to dividing section 110. Here, the internal configuration and operations of ZC sequence setting section 1000 will be described later.

Dividing section 110 divides the ZC sequences corresponding to each radio mobile station apparatus 200, calculated in ZC sequence setting section 1000, by the ZC sequences actually used in each radio mobile station apparatus 200 and received as input from demapping section 109, and outputs the division result to IFFT (Inverse Fast Fourier Transform) section 111.

IFFT section 111 performs IFFT processing on the division result received as input from dividing section 110, and outputs the signal subjected to IFFT processing to mask processing section 112.

Mask processing section 112 extracts the correlation value in the region in which the correlation value of the desired cyclic shift sequence is present, that is, extracts the correlation value in the window part, by performing mask processing on the signal received as input from IFFT section 111, and outputs the extracted correlation value to DFT section 113.

DFT section 113 performs DFT processing on the correlation value received as input from mask processing section 112, and outputs the correlation value subjected to DFT processing to frequency domain equalization section 116. Here, the signal subjected to DFT processing outputted from DFT section 113, represents the frequency response of the channel.

DFT section 114 transforms the time domain data signal and control signal received as input from demultiplexing section 106, into the frequency domain by performing DFT processing, and outputs the transformed, frequency domain data signal and control signal to demapping section 115.

Demapping section 115 extracts the data signal and control signal corresponding to the transmission band of each radio mobile station apparatus 200, from signals received as input from DFT section 114, and outputs the extracted signals to frequency domain equalization section 116.

Frequency domain equalization section 116 performs equalization processing on the data signal and control signal received as input from demapping section 115, using a signal which is received as input from DFT section 113 in channel estimating section 108 and which represents the frequency response of the channel, and outputs the signals subjected to equalization processing to IFFT section 117.

IFFT section 117 performs IFFT processing on the data signal and control signal received as input from frequency domain equalization section 116, and outputs the signals subjected to IFFT processing to demodulating section 118.

Demodulating section 118 performs demodulation processing on the signals subjected to IFFT processing received as input from IFFT section 117, and outputs the signals subjected to demodulation processing to decoding section 119.

Decoding section 119 performs decoding processing on the signals subjected to demodulation processing received as input from demodulating section 118, and extracts received data.

Figure 11:
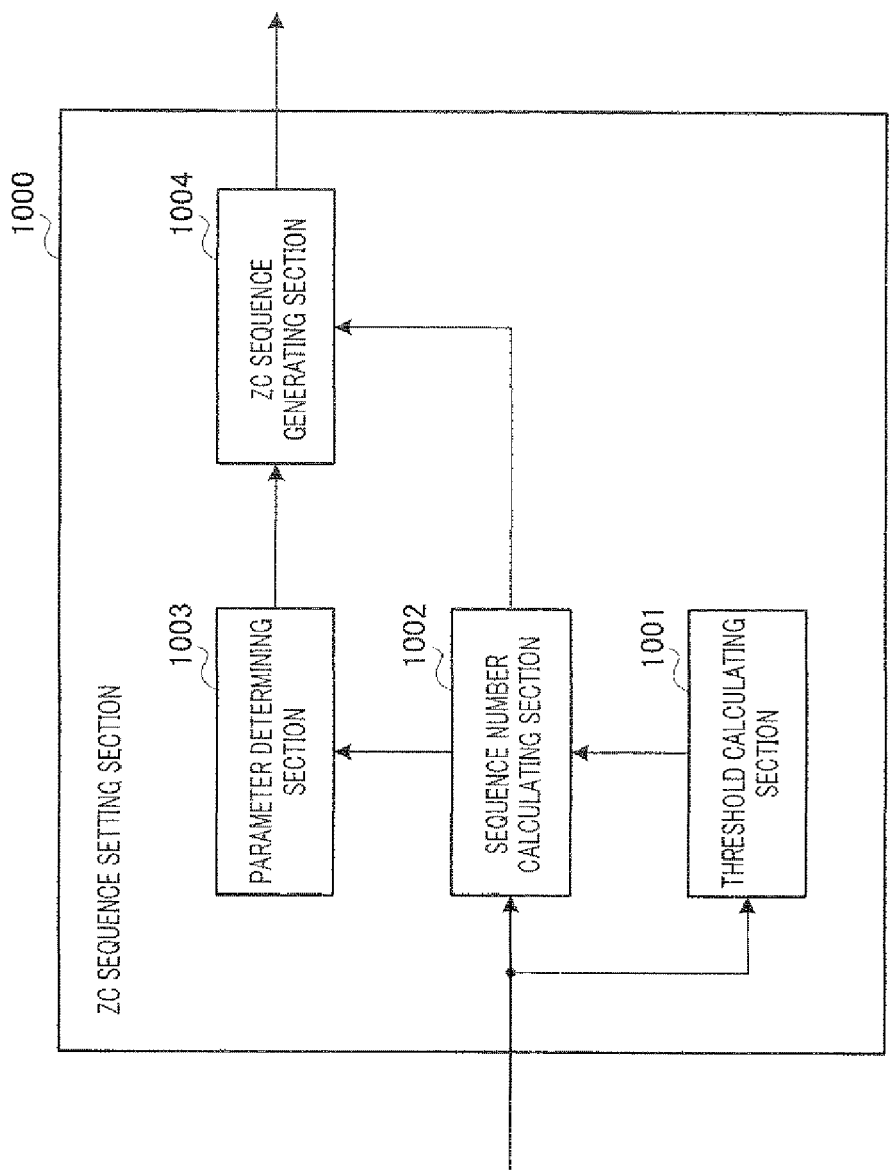
FIG. 11 is a block diagram showing the configuration inside a ZC sequence setting section according to an embodiment of the present invention.

FIG. 11 is a block diagram showing the configuration inside ZC sequence setting section 1000.

Threshold calculating section 1001 calculates the thresholds $Xth1(m)$ and $Xth2(m)$ according to, for example, equation 7 and equation 8, using the number of RB's m included in control information received as input, and outputs the results to sequence number calculating section 1002.

Sequence number calculating section 1002 calculates the sequence length N of a ZC sequence that can be used as a reference signal, based on the number of RB's m included in control information received as input, and outputs the result to ZC sequence generating section 1004. Also, based on the calculated sequence length N, the reference sequence number rb and the reference sequence length Nb included in the control information received as input, and the thresholds $Xth1(m)$ and $Xth2(m)$ received as input from threshold calculating section 1001, sequence number calculating section 1002 calculates the sequence number r that satisfies equation 4 and that does not satisfy equation 6, and outputs the result to parameter determining section 1003.

Parameter determining section 1003 selects one of usable r's received as input from sequence number calculating section 1002, and outputs the result to ZC sequence generating section 1004. To be more specific, parameter determining section 1003 selects r corresponding to the remainder acquired by dividing the frame number or slot number by the number of usable r's, that is, r that corresponds to the result of performing a modulo operation of the frame number or slot number by the number of usable r's. For example, upon receiving as input four usable r's of r=a, b, c and d from sequence number calculating section 1002, parameter determining section 1003 selects r=a when a result of performing a modulo operation on the frame number or slot number by 4 is 0, selects r=b when the result is 1, selects r=c when the result is 2, and selects r=d when the result is 3. By this means, it is possible to realize sequence hopping.

ZC sequence generating section 1004 generates a ZC sequence according to equation 1 or equation 2, using "r" received as input from parameter determining section 1003 and "N" received as input from sequence number calculating section 1002, and outputs the result to dividing section 110.

As described above, radio base station apparatus 100 signals the reference sequence number rb, the reference sequence length Nb and the number of RB's m, to radio mobile station apparatus 200.

Next, radio mobile station apparatus 200 that generates a ZC sequence used as a reference signal using the reference sequence number rb, the reference sequence length Nb and the number of RB's m signaled from radio base station apparatus 100, will be explained.

Figure 12:
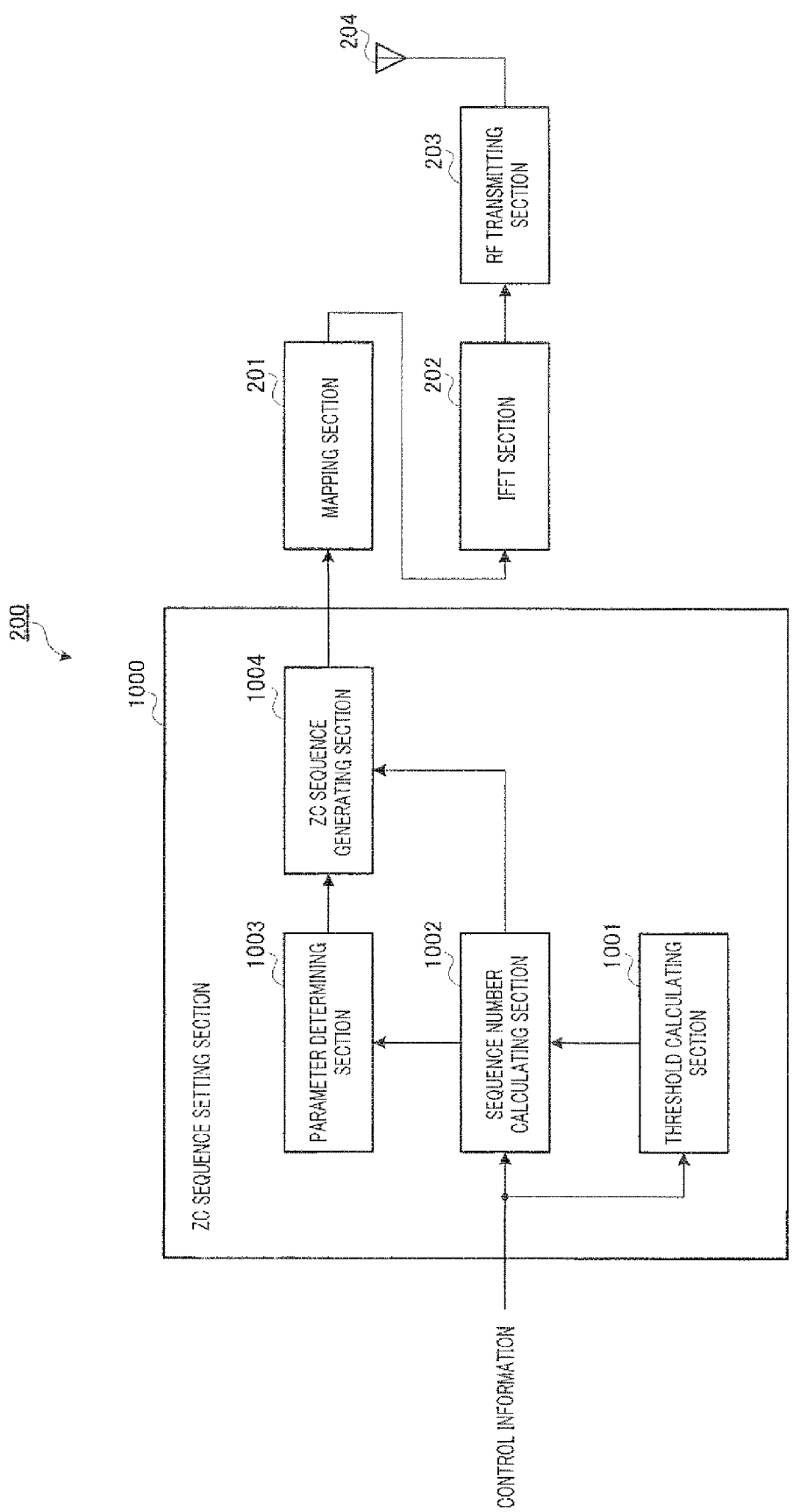
FIG. 12 is a block diagram showing the configuration of a radio mobile station apparatus according to an embodiment of the present invention.

FIG. 12 is a block diagram showing the configuration of radio mobile station apparatus 200 according to the present embodiment. Here, in FIG. 12, the receiving system of radio mobile station apparatus 200 will be omitted, and the transmitting system alone will be shown.

In FIG. 12, similar to ZC sequence setting section 1000 provided in radio base station apparatus 100, ZC sequence setting section 1000 provided in radio mobile station apparatus 200 calculates a ZC sequence based on the reference sequence number rb, the reference sequence length Nb and the number of RB's in included in control information transmitted from radio base station apparatus 100, and outputs the result to mapping section 201.

Mapping section 201 maps the ZC sequence received as input from ZC sequence setting section 1000, to the transmission band of radio mobile station apparatus 200, and outputs the mapped ZC sequence to IFFT section 202.

IFFT section 202 performs IFFT processing on the ZC sequence received as input from mapping section 201, and outputs the ZC sequence subjected to IFFT processing to RF transmitting section 203.

RF transmitting section 203 performs transmission processing such as D/A conversion, up-conversion and amplification on the ZC sequence received as input from IFFT section 202, and transmits the signal subjected to transmission processing, via antenna 204.

Thus, according to the present embodiment, by forming a sequence group using ZC sequences in which the difference between r/N and rb/Nb is equal to or less than $Xth1(m)$, and by allocating the sequence group to a single cell, it is possible to reduce cross-correlation between different sequence groups and reduce inter-cell interference. Also, according to the present embodiment, by deleting, from a sequence group, ZC sequences in which the difference between r/N and rb/Nb is less than $Xth2(m)$, it is possible to reduce cross-correlation in a single sequence group and, when the single sequence group is allocated to adjacent cells, reduce inter-cell interference.

Also, although an example case has been described above with the present embodiment where the sequence length of one RB is used as the reference sequence length Nb in ST 101, the present invention is not limited to this, and it is equally possible to set the reference sequence length Nb adaptively. For example, taking into account that, amongst ZC sequences forming a certain sequence group, the reference ZC sequence has the lowest cross-correlation with other sequence groups, the reference sequence length Nb is the sequence length associated with the number of RB's used in a radio mobile station apparatus in the cell edge of the poorest received quality. By this means, it is further possible to reduce inter-cell interference.

Also, an example case has been described above with the present embodiment where the reference sequence length Nb signaled from radio base station apparatus 100 to radio mobile station apparatus 200, with an assumption that the reference sequence length Nb varies between cells. However, the present invention is not limited to this, and, if a reference sequence length Nb that is common between all cells is determined in advance, signaling is not necessary. Alternatively, it is equally possible to determine in advance the reference number of RB's m instead of the reference sequence length Nb. The numbers of RB's and sequence lengths are uniquely associated, so that it is possible to derive the reference sequence length Nb from the reference number of RB's m.

Also, an example case has been described above with the present embodiment where sequence number calculating section 1002 calculates the sequence number r using the reference sequence number rb, the reference sequence length Nb and the number of RB's m. However, the present invention is not limited to this, and, if radio base station apparatus 100 and radio mobile station apparatus 200 hold the sequence group shown in FIG. 9 in tables, sequence number calculating section 1002 may find the sequence number r by looking up these tables. An example method of determining the sequence number r using these tables will be explained below. For example, with an assumption that the reference sequence length Nb is fixed, tables are prepared for the two parameters of the sequence length N and the reference sequence number rb, and selectable r's are described therein. In this example, radio mobile station apparatus 100 receives the sequence length N and reference sequence number rb signaled from radio base station apparatus 200, refers to the tables associated with these items and determines a Zadoff-Chu sequence that should be used as a reference signal by selecting in a random manner one of the described values that r might assume.

Also, an example case has been described above with the present embodiment where parameter determining section 1003 selects one of usable sequence numbers r's based on the frame number or slot number. However, the present invention is not limited to this, and parameter determining section 1003 may select the minimum or maximum sequence number from usable sequence number r's.

Also, in the above embodiments, as further conditions for generating sequence groups, sequences, in which CM (Cubic Metric) or PAPR is greater than a predetermined value, such as CM or PAPR in QPSK, may not be used and may be deleted from a sequence group. In this case, the magnitude of CM or PAPR is less biased between sequence groups, so that, even if such conditions are added, it is possible to make the number of sequences substantially equal between sequence groups, and the number of sequences that can be used in each sequence group is not biased.

Also, although an example case has been described above with the present embodiment where sequence groups are formed using frequency domain ZC sequences, the present invention is not limited to this, and it is equally possible to form sequence groups using ZC sequences that are generated in the time domain. Here, time domain ZC sequences and frequency domain ZC sequences satisfy the relationship represented by following equation 9.

$$(u \times r) \bmod(N) = N - 1 \qquad \text{(Equation 9)}$$

In equation 9, N represents the ZC sequence length, r represents the sequence number of a time domain ZC sequence, and u represents the sequence number of a frequency domain ZC sequence. Therefore, when a sequence group is formed using time domain ZC sequences, ZC sequences are found in which the difference of u/N from the reference sequence is equal to or less than a first predetermined threshold and equal to or greater than a second threshold. Time domain ZC sequences and frequency domain ZC sequences share the same characteristics, and therefore the same effect is acquired.

Also, although an example case has been described above with the present embodiment where a ZC sequence is used as a reference signal for channel estimation, the present invention is not limited to this, and it is equally possible to use a ZC sequence as, for example, a reference signal for CQI estimation (i.e. sounding RS), synchronization channel, random access preamble signal, CQI signal or ACK/NACK signal.

Also, although an example case has been described above with the present embodiment where a ZC sequence is used as a reference signal from a radio mobile station apparatus to a radio base station apparatus, the present invention is not limited to this, and it is equally possible to apply the present invention to a case where a ZC sequence is used as a reference signal from a radio base station apparatus to a radio mobile station apparatus.

Also, although an example case has been described above with the present embodiment where a ZC sequence is used as a reference signal, it is equally possible to use, for example, a GCL (Generalized Chirp-Like) sequence c(k) represented by following equation 10, as a reference signal.

$$c(k) = a(k) b(k \bmod m), \, k = 0, 1, \ldots, N-1 \qquad \text{(Equation 10)}$$

In equation 10, N represents the sequence length, and the relationship of $N = sm^2$ (where s and m are integers) or $N = tm$ (where t and m are integers) holds. Here, a(k) is a ZC sequence, represented by equation 1 or equation 2, and b(k) is a DFT sequence, represented by following equation 11.

[3]

$$b_i(k)=W_m^{ik}, i,k=0,1,\ldots,m-1 \quad \text{(Equation 11)}$$

Also, although the present embodiment uses the condition "equal to or less than a threshold" as a decision condition, it is equally possible to use the condition "less than a threshold" as a decision condition.

Also, the above embodiments have been described using Zadoff-Chu sequences. However, Zadoff-Chu sequences are not limited to the sequences represented by the above equations, and include a sequence generated by repeating part of a Zadoff-Chu sequence, a sequence generated by truncating part of a Zadoff-Chu sequence and a sequence generated by removing part of a Zadoff-Chu sequence.

Although a case has been described above with the present embodiment as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-161934, filed on Jun. 19, 2007, including the specification, drawings and abstract, is incorporated herein by reference in its entirety.

Industrial Applicability

The sequence allocating method and radio mobile station apparatus according to the present invention can reduce cross-correlation between different sequence groups and reduce cross-correlation in a single sequences group, and are applicable to a cellular radio communication system.

The invention claimed is:

1. A sequence allocating method for a sequence used as a reference signal, the method comprising:
setting a reference sequence length Nb for a sequence length N and a reference sequence number rb for a sequence number r;
selecting a plurality of sequences in which a difference between r/N and rb/Nb is equal to or less than a first threshold or less than the first threshold and equal to or greater than a second threshold that is less than the first threshold; and
allocating the plurality of sequences selected to a single cell.

2. The sequence allocating method according to claim 1, wherein the sequence used as the reference sequence comprises a constant amplitude and zero auto-correlation code sequence and a Zadoff-Chu sequence.

3. The sequence allocating method according to claim 1, wherein the second threshold adopts a larger value when the sequence length N increases.

4. A radio mobile station apparatus comprising:
a setting section configured to set a first threshold and a second threshold that is less than the first threshold, based on a sequence length N signaled from a radio base station apparatus;
a selector configured to select a sequence in which a difference between r/N and rb/Nb (where r is a sequence number and Nb is a reference sequence length) is equal to or less than the first threshold or less than the first threshold and equal to or greater than the second threshold, using a reference sequence number rb signaled from the radio base station apparatus; and
a transmitter configured to transmit the selected sequence as a reference signal.

5. The radio mobile station apparatus according to claim 4, wherein the sequence used as the reference signal comprises a constant amplitude and zero auto-correlation code sequence and a Zadoff-Chu sequence.

6. The radio mobile station apparatus according to claim 4, wherein the second threshold adopts a larger value when the sequence length N increases.

7. The radio mobile station apparatus according to claim 4, wherein the reference sequence length Nb is signaled from the radio base station apparatus.

8. The radio mobile station apparatus according to claim 4, wherein:
the reference sequence length Nb is a fixed value; and
the selection is performed using a table associated with the sequence length N and the reference sequence number rb.

9. A transmitting method in a radio mobile station apparatus, comprising:
setting a first threshold and a second threshold that is less than the first threshold, based on a sequence length N signaled from a radio base station apparatus;
selecting a sequence in which a difference between r/N and rb/Nb (where r is a sequence number and Nb is a reference sequence length) is equal to or less than the first threshold or less than the first threshold and equal to or greater than the second threshold, using a reference sequence number rb signaled from the radio base station apparatus; and
transmitting the selected sequence as a reference signal.

10. The transmitting method according to claim 9, wherein the sequence used as the reference signal comprises a constant amplitude and zero auto-correlation code sequence and a Zadoff-Chu sequence.

11. A radio communication apparatus comprising:
a setting section configured to set a reference sequence length Nb for a sequence length N and a reference sequence number rb for a sequence number r;
a selector configured to select a plurality of sequences in which a difference between r/N and rb/Nb is equal to or less than a first threshold or less than the first threshold and equal to or greater than a second threshold that is less than the first threshold; and
an allocation section configured to allocate the plurality of sequences selected to a single cell.

* * * * *